United States Patent
Gustafsson et al.

(10) Patent No.: US 9,288,700 B2
(45) Date of Patent: Mar. 15, 2016

(54) METHOD, NETWORK NODE, COMPUTER PROGRAM AND COMPUTER PROGRAM PRODUCT FOR DETERMINING A DROPPED CONNECTION

(75) Inventors: Christer Gustafsson, Huddinge (SE);
Ulf Hubinette, Linköping (SE);
Andreas Olsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/374,891

(22) PCT Filed: Jan. 26, 2012

(86) PCT No.: PCT/SE2012/050080
§ 371 (c)(1),
(2), (4) Date: Jul. 25, 2014

(87) PCT Pub. No.: WO2013/112086
PCT Pub. Date: Aug. 1, 2013

(65) Prior Publication Data
US 2015/0215796 A1 Jul. 30, 2015

(51) Int. Cl.
*H04W 24/08* (2009.01)
*H04W 24/10* (2009.01)
(Continued)

(52) U.S. Cl.
CPC .............. *H04W 24/08* (2013.01); *H04M 15/59* (2013.01); *H04W 24/10* (2013.01); *H04W 72/087* (2013.01); *H04W 76/06* (2013.01); *H04W 88/08* (2013.01)

(58) Field of Classification Search
CPC ... H04M 2215/32; H04M 7/006; H04W 4/24; H04L 47/10; H04L 5/0007; H04L 29/06027
USPC ........ 455/405, 445, 412.2; 370/252, 352, 344
See application file for complete search history.

(56) References Cited

U.S. PATENT DOCUMENTS

| | | | |
|---|---|---|---|
| 2008/0081628 A1* | 4/2008 | Ye et al. | 455/445 |
| 2008/0182562 A1* | 7/2008 | Bohme et al. | 455/414.2 |
| 2010/0027431 A1 | 2/2010 | Morrison et al. | |

FOREIGN PATENT DOCUMENTS

| | | |
|---|---|---|
| JP | H9-163014 A | 6/1997 |
| JP | 2005-20311 A | 1/2005 |
| WO | 2007069319 A1 | 6/2007 |

OTHER PUBLICATIONS

International Search Report and Written Opinion, Application No. PCT/SE2012/050080, Nov. 6, 2012, 16 pages.

(Continued)

*Primary Examiner* — Phuoc H Doan
(74) *Attorney, Agent, or Firm* — Nicholson De Vos Webster & Elliott, LLP (57) ABSTRACT

A method is performed in a network node of a mobile communication network, for determining a dropped connection to a mobile terminal. The method comprises: detecting a release of a radio bearer associated with the mobile terminal; determining whether the radio bearer is a real-time type radio bearer; when the radio bearer is a real-time type radio bearer, determining the released radio bearer to be a dropped connection when the release is classified as an involuntary release; and when the radio bearer differs from a real-time type radio bearer, determining the released radio bearer to be a dropped connection when there is remaining user data in a buffer for transfer in either direction over the released radio bearer. A corresponding network node, computer program and computer program product are also presented.

21 Claims, 4 Drawing Sheets

(51) Int. Cl.
*H04M 15/00* (2006.01)
*H04W 72/08* (2009.01)
*H04W 76/06* (2009.01)
*H04W 88/08* (2009.01)

(56) References Cited

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 10) ," 3GPP TS 36.413 V10.4.0 (2011-12), 255 pages, 3GPP Organizational Partners, Valbonne, France.

"3rd Generation Partnership Project; Technical Specification Group Services and System Aspects; Telecommunication management; Key Performance Indicators (KPI) for Evolved Universal Terrestrial Radio Access Network (E-UTRAN): Definitions (Release 10)," 3GPP TS 32.450 V10.1.0 (Jun. 2011), 17 pages, 3GPP Organizational Partners, Valbonne, France.

"3rd Generation Partnership Project; Technical Specification Group Services and System Aspects; Telecommunication management; Performance Management (PM); Performance measurements, Evolved Universal Terrestrial Radio Access Network (E-TRAN) (Release 11)," 3GPP TS 32.425 V11.1.0 (Dec. 2011), 66 pages, 3GPP Organizational Partners, Valbonne, France.

"3rd Generation Partnership Project; Technical Specification Group Services and System Aspects; Telecommunication management; Performance Management (PM); Performance measurements; Universal Terrestrial Radio Access Network (UTRAN) (Release 11)," 3GPP TS 32.405 V11.0.0 (Jun. 2011), 188 pages, 3GPP Organizational Partners, Valbonne, France.

Ericsson, "Correction of E•RAB activity measurements used by Retainability KPI," 3GPP TSG SA WG5 (Telecom Management) Meeting #83, May 26-30, 2012; Sarajevo, Bosnia & Herzegovina, 2 pages.

Ericsson, et al., "Correction of E-RAB activity measurements used by Retainability KPI," 3GPP TSG-SA5 Meeting #83, Sarajevo, Bosnia & Herzegovina, May 7-11, 2012, 6 pages.

Ericsson, "Correction of E-RAB activity measurements used by Retainability KPI," 3GPP TSG SA WG5 (Telecom Management) SA5#82, Mar. 26-30, 2012; San Jose del Cabo, Mexico, 4 pages.

International Preliminary Report on Patentability (Chapter I), Application No. PCT/SE2012/050080, Jul. 29, 2014, 10 pages.

Notice of Reasons for Rejection, JP Application No. 2014-554690, dated Dec. 8, 2015, 1 page.

* cited by examiner

METHOD, NETWORK NODE, COMPUTER PROGRAM AND COMPUTER PROGRAM PRODUCT FOR DETERMINING A DROPPED CONNECTION

CROSS-REFERENCE TO RELATED APPLICATIONS

This application is a National stage of International Application No. PCT/SE2012/050080, filed Jan. 26, 2012, which is hereby incorporated by reference.

TECHNICAL FIELD

The invention relates to mobile communication networks and in particular to determining a dropped connection in a mobile communication network.

BACKGROUND

In mobile communication networks, dropped connections are undesired and can cause significant frustration for end users. It is thus desired to detect and measure dropped connections as part of a quality measurement or key performance indicator (KPI). In modern mobile communication networks such as Long Term Evolution (LTE) of the 3rd Generation Partnership Project (3GPP), the measurement for drop rate is calculated using dropped connections, which is dropped bearers when there is remaining data in the buffer, and a session duration, determined to end 100 ms after the last data transfer over the buffer. Such an approach may work for best-effort type traffic, such as web or e-mail data. However, determining dropped connections and drop rate in this way is not suitable for real-time services such as voice conversations or streaming media. For example, during established voice conversations, inactive periods of up to 160 ms are common, e.g. between silence descriptors.

One way to customise the measurement for real-time services could be to increase the session time beyond the 100 ms after the last data transfer. However, this has the disadvantage of best-effort type traffic having session times which are longer than what reflects the service used.

SUMMARY

It is an object of embodiments herein to determine a dropped connection such that it better reflects the user experience of drop, regardless whether the connection relates to best-effort traffic or to a real-time service such as voice.

In a first aspect, it is presented a method, performed in a network node of a mobile communication network, for determining a dropped connection to a mobile terminal. The method comprises the steps of: detecting a release of a radio bearer associated with the mobile terminal; determining whether the radio bearer is a real-time type radio bearer; when the radio bearer is a real-time type radio bearer, determining the released radio bearer to be a dropped connection when the release is classified as an involuntary release; and when the radio bearer differs from a real-time type radio bearer, determining the released radio bearer to be a dropped connection when there is remaining user data in a buffer for transfer in either direction over the released radio bearer. By differentiating between real-time type radio bearers and non-real-time type radio bearers, the determination of a dropped connection can be tailored towards the service type. In this way, for real-time type bearers, any released bearer during the session is considered a dropped connection, as it most likely causes a service disruption for the end-user. On the other hand, for non-real-time bearers, a released bearer is only considered a dropped connection if there is data in a buffer for the bearer, which is more accurate for such non-continuous data transfer.

When the radio bearer is a real-time type radio bearer, the released radio bearer may optionally be determined to be a dropped connection only when the release is classified as an involuntary release. When the radio bearer differs from a real-time type radio bearer, the released radio bearer may optionally be determined to be a dropped connection only when there is remaining user data in a buffer for transfer in either direction over the released radio bearer. In other words, only the specified conditions would in this case be sufficient for the released bearer to be considered a dropped connection.

When the radio bearer differs from a real-time type radio bearer, the released radio bearer may be determined to be a dropped connection when there is remaining user data in a buffer for transfer in either direction over the released radio bearer and the release is classified as an involuntary release.

The step of determining whether the radio bearer is a real-time type radio bearer may comprise determining the radio bearer to be a real-time radio bearer when a quality of service class identifier, associated with the radio bearer, comprises a parameter indicating guaranteed bit rate. A guaranteed bit rate parameter (GBR) can be a convenient and reasonable indicator of real-time traffic for added flexibility.

The step of determining whether the radio bearer is a real-time type radio bearer may comprise: determining the radio bearer to be a real-time radio bearer when a quality of service class identifier, associated with the radio bearer, comprises a real-time parameter indicating a real-time service, which real-time parameter is absent from any telecommunication standard with which the mobile communication network complies. This real-time parameter can optionally override the GBR parameter, whereby the classification between real-time and non-real-time for measurement purposes is decoupled from the GBR parameter.

The release may be classified as an involuntary release using a release cause code associated with the released radio bearer.

The involuntary release may be a release which is involuntary from a perspective of a user of the mobile terminal.

The method may further comprise the steps of: repeating the mentioned steps during a measurement period for all mobile terminals under the control of the radio network node; obtaining session duration measurements for all radio bearers under the control of the radio network node in the measurement period; and calculating a drop rate measurement by dividing a number of dropped connections during the measurement period with a sum of the session duration measurements during the measurement period. In this way, the drop rate measurement takes into consideration the improved way of determining a dropped connection.

The step of obtaining session duration measurements may comprise, for radio bearers when the radio bearer is a real-time type radio bearer, determining the session duration to be the duration of when the radio bearer is established; and when the radio bearer differs from a real-time type radio bearer, determining the session duration to be the start of the radio bearer until there is an absence of data transfer on the radio bearer during at least a predetermined inactivity time. In other words, the session for real-time type bearers is the entire duration of the bearer, while for non-real-time bearers, the session is considered to have ended after the inactivity time after the last data transfer. This allows a determination of session time to be based on whether the bearer is real-time, allowing further customisation of the drop rate measurement to accommodate for the quite different characteristics between real-time services and non-real-time services.

The predetermined inactivity time may be 100 ms.

A second aspect is a network node arranged to be part of a mobile communication network also comprising a mobile terminal. The network node comprises: a radio bearer release detector, arranged to detect a release of a radio bearer associated with the mobile terminal; a radio bearer type determiner arranged to determine whether the radio bearer is a real-time type radio bearer; and a dropped connection determiner arranged to determine, when the radio bearer is a real-time type radio bearer, the released radio bearer to be a dropped connection when the release is classified as an involuntary release; and determine, when the radio bearer differs from a real-time type radio bearer, the released radio bearer to be a dropped connection when there is remaining user data in a buffer for transfer in either direction over the released radio bearer.

The dropped connection determiner may be arranged to determine, when the radio bearer is a real-time type radio bearer, the released radio bearer to be a dropped connection only when the release is classified as an involuntary release. Furthermore, when the radio bearer differs from a real-time type radio bearer, the released radio bearer may be determined to be a dropped connection only when there is remaining user data in a buffer for transfer in either direction over the released radio bearer.

The dropped connection determiner may be arranged to determine, when the radio bearer differs from a real-time type radio bearer, the released radio bearer to be a dropped connection when there is remaining user data in a buffer for transfer in either direction over the released radio bearer and the release is classified as an involuntary release.

The radio bearer type determiner may be arranged to determine the radio bearer to be a real-time radio bearer when a quality of service class identifier, associated with the radio bearer, comprises a parameter indicating guaranteed bit rate.

The radio type determiner may be arranged to determine the radio bearer to be a real-time radio bearer when a quality of service class identifier, associated with the radio bearer, comprises a real-time parameter indicating a real-time service, which real-time parameter is absent from any telecommunication standard with which the mobile communication network complies.

The dropped connection determiner may be arranged to classify the release as an involuntary release using a release cause code associated with the released radio bearer.

The involuntary release may be a release which is involuntary from a perspective of a user of the mobile terminal.

The network node may further comprise: a session duration obtainer arranged to obtain session duration measurements for all radio bearers under the control of the radio network node during a measurement period; and a drop rate calculator arranged to calculate a drop rate measurement by dividing a number of dropped connections during the measurement period divided with a sum of the session duration measurements during the measurement period.

The session duration obtainer may be arranged to, for radio bearers when the radio bearer is a real-time type radio bearer, determine the session duration to be the duration of when the radio bearer is established. When the radio bearer differs from a real-time type radio bearer, the session duration may be determined to be the start of the radio bearer until there is an absence of data transfer on the radio bearer during at least a predetermined inactivity time.

The predetermined inactivity time may be 100 ms.

A third aspect is a computer program for determining a dropped connection to a mobile terminal. The computer program comprises computer program code which, when run on a network node, causes the network node to: detect a release of a radio bearer associated with the mobile terminal; determine whether the radio bearer is a real-time type radio bearer; when the radio bearer is a real-time type radio bearer, determine the released radio bearer to be a dropped connection when the release is classified as an involuntary release; and when the radio bearer differs from a real-time type radio bearer, determine the released radio bearer to be a dropped connection when there is remaining user data in a buffer for transfer in either direction over the released radio bearer.

A fourth aspect is a computer program product comprising a computer program according to claim 19 and a computer readable means on which the computer program is stored.

The mobile communication network may comply with the Long Term Evolution set of standards as defined by the 3rd Generation Partnership Project (3GPP).

It is to be noted that any feature of any aspect may, where appropriate, be applied to any other aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown.

This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
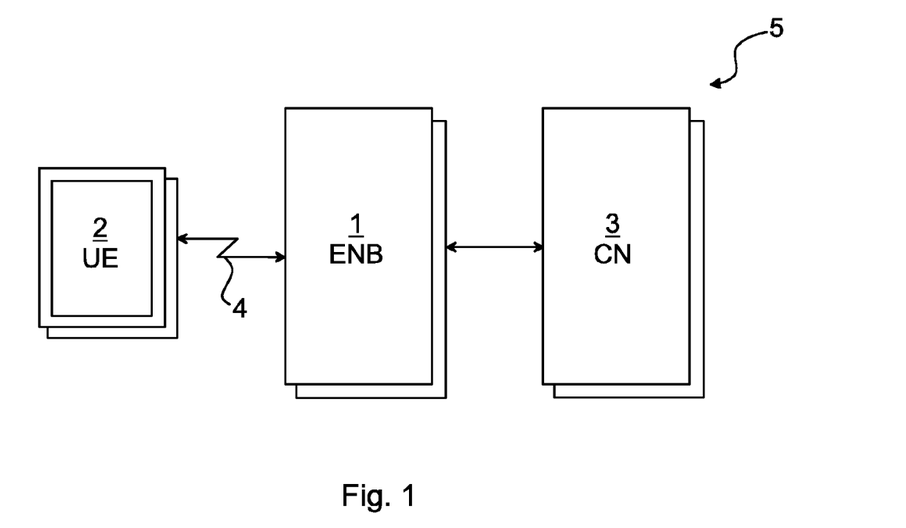
FIG. 1 is a schematic diagram illustrating an environment where embodiments presented herein can be applied.

FIG. 1 is a schematic diagram illustrating a mobile communication network 5 where embodiments presented herein can be applied. The mobile communications network 5 comprises a core network 3 and one or more network nodes 1, here in the form of evolved Node Bs 1, also known as e-Node Bs or eNBs. The network nodes 1 provide radio connectivity to a plurality of mobile terminals 2. The term mobile terminal is also known as user equipment, mobile communication terminal, user terminal, user agent, etc.

The mobile communication network 5 can e.g. comply with LTE (Long Term Evolution) or with any one or a combination of UMTS (Universal Mobile Telecommunications System), CDMA2000 (Code Division Multiple Access 2000), etc., as long as the principles described hereinafter are applicable.

The communication between each one of the mobile terminals 2 and the network node 1 occurs over one ore more radio bearers 4 (only one shown here), also known as radio access bearers.

Figure 2A:
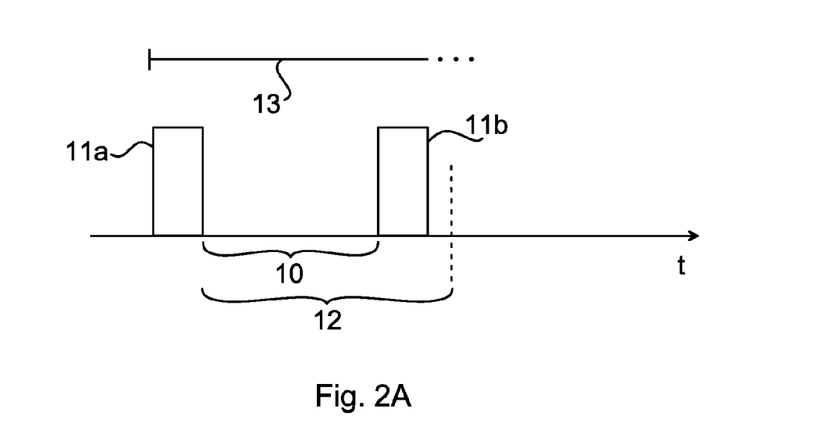
FIGS. 2A-B are schematic graphs illustrating determination of session duration in a network node of FIG. 1.
Figure 2B:
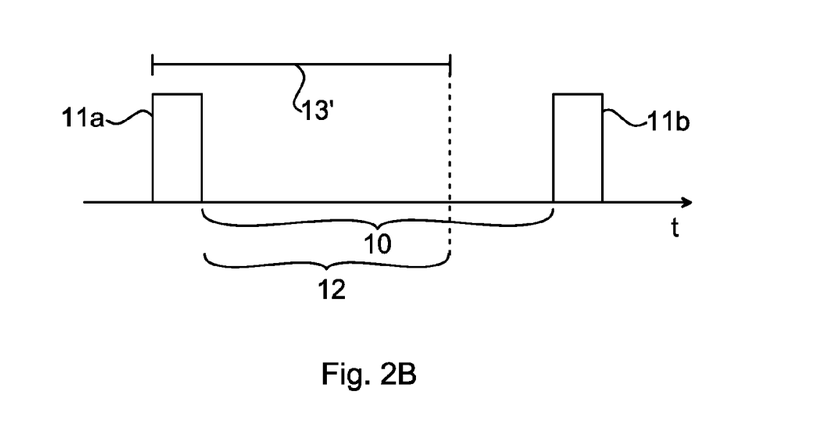

FIGS. 2A-B are schematic graphs illustrating determination of session duration in a network node of FIG. 1 for a radio bearer which is not real-time. As will be explained in more detail below, the session duration can be used to calculate a drop rate measurement.

In FIG. 2A, first data transfer 11a occurs at a first time and second data transfer 11b occurs at a second time over a radio bearer between the mobile terminal and network node of FIG. 1. The data transfer can be either uplink or downlink and the first and second data transfers 11a-b can differ in this respect or go in the same direction.

A predetermined inactivity time 12 is set to a specific value, e.g. 100 ms. This means that the as long as there is data transfer on the radio bearer within the inactivity time, the session is considered to continue. In other words, the session expires after the inactivity time, as measured from the last data transfer.

In the situation shown in FIG. 2A, the session 13 includes both the first data transfer 11a and the second data transfer 11b, since a duration 10 between the first and second data transfers 11a-b is shorter than the inactivity time 12.

In the situation shown in FIG. 2B, a session 13' only covers the first data transfer, since the duration 10 between the first and second data transfers 11a-b is longer than the inactivity time 12. In this example, the session 13' ends at a time when the inactivity time 12 expires without any further data transfer.

The determination of session duration explained above thus applies for radio bearers that which are not of type real-time. Such non-real-time bearers can be used for best effort type traffic, such as for e-mail, web browsing etc.

However, for real-time radio bearers, determining session in this way is not accurate. For example, during silence for voice calls (which is one typical example of real-time type traffic), there may be longer periods between data transfers than the inactivity time. In one example, the typical duration between silence descriptors in a voice call can be 160 ms, which is longer than the 100 ms example mentioned above.

Hence, the session duration for real-time type radio bearers would benefit from being determined differently. In one embodiment, the session duration for real-time type radio bearers can be determined to be the duration of when the radio bearer is established. In other words, the session starts when the bearer is set up (or when the first data transfer occurs) and the session ends when the bearer is released (or when the last data transfer occurs). The release can be either voluntary or involuntary.

Figure 3A:
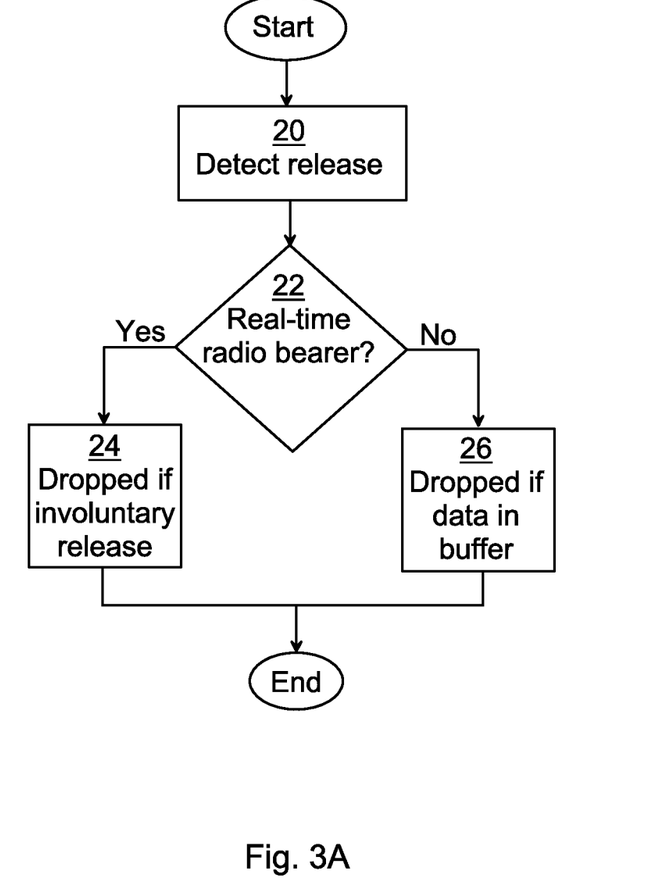
FIGS. 3A-B are flow charts illustrating methods according to embodiments performed in the network node of FIG. 1.
Figure 3B:
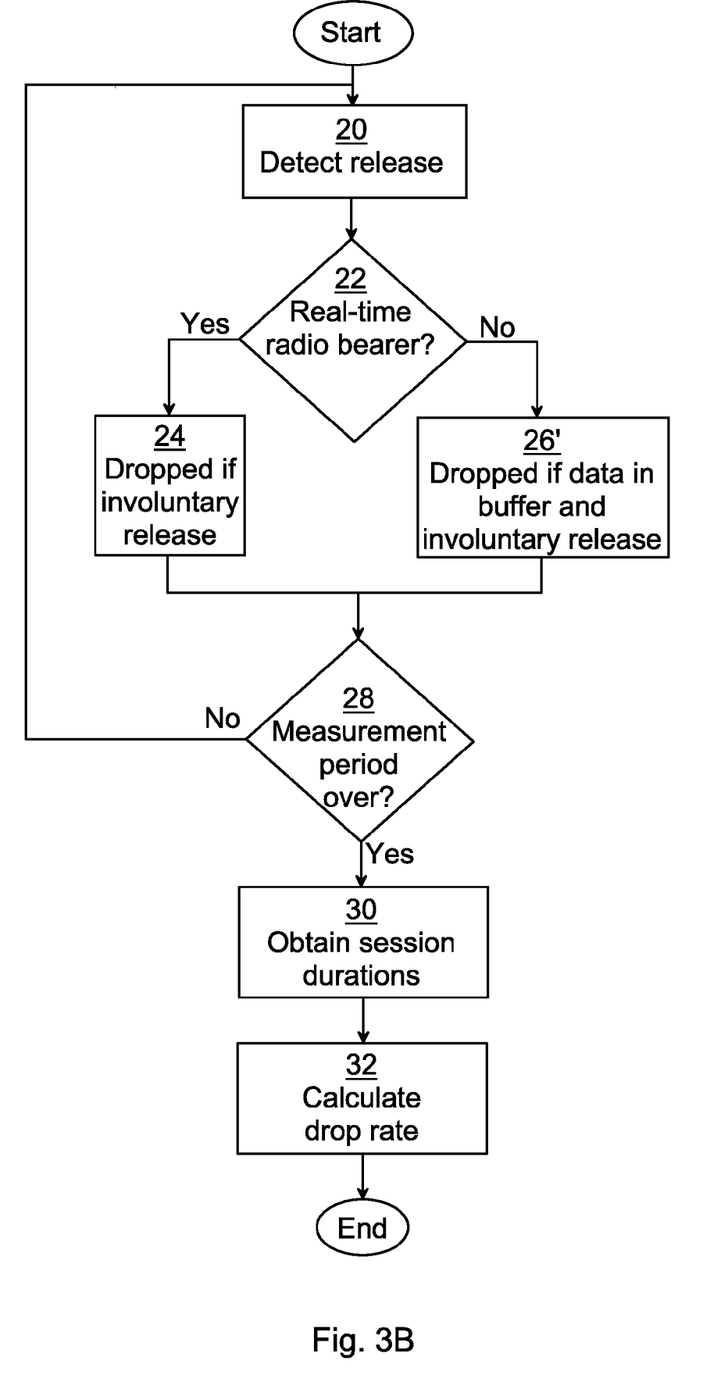

FIGS. 3A-B are flow charts illustrating methods according to embodiments performed in the network node of FIG. 1. In FIG. 3A, the method is performed to determine a dropped connection, as represented by a radio bearer, to a mobile terminal. The method can be implemented in all network nodes being responsible for bearers to mobile terminals, in an entire mobile communication network.

In an initial detect release step 20, a release of a radio bearer is detected. The radio bearer is associated with a particular mobile terminal.

In a conditional real-time radio bearer step 22 it is determined whether the previously released radio bearer is a real-time type radio bearer. When the radio bearer is a real-time type radio bearer, the method continues to a dropped if involuntary release step 24. Otherwise, the method continues to a dropped if data in buffer step 26.

This determination can optionally utilise a quality of service class identifier (QCI) table. Each bearer is associated with a class in the QCI table. One parameter in the QCI table is a guaranteed bit rate (GBR) parameter. In this way, each bearer can be determined as being either a GBR bearer or a non-GBR bearer, whereby a GBR bearer can be considered to be a real-time type radio bearer and a non-GBR bearer can be considered to be a non-real-time type radio bearer.

Optionally, a real-time parameter not part of the standard specification for the QCI table can be added to the QCI table to indicate the class to be of real-time service. This real-time parameter can optionally override the GBR parameter, whereby the classification between real-time and non-real-time for measurement purposes is decoupled from the GBR parameter.

In the dropped if involuntary release step 24, the release is determined to be a dropped connection when the release is classified as an involuntary release. Optionally, this only occurs when the release is classified as an involuntary release using a release cause code associated with the released radio bearer. The term involuntary can be thought of as involuntary from a perspective of a user of the mobile terminal, e.g. a release due to congestion, insufficient signal quality, etc.

In the dropped if data in buffer step 26, the release is determined to be a dropped connection when there is remaining user data in a buffer for transfer in either direction over the released radio bearer. Optionally, this only occurs when there is user data in a buffer for transfer in either direction over the released radio bearer.

Dropped connection is here interpreted as a release of a connection which results in a negative user experience. For example for non-real-time connections, a dropped connection can necessitate a new radio bearer needing to be set up which results in delay for the end user. For real-time connections, a dropped connection can result in an abruptly ended session, such as a voice call being torn down or a streaming media session abruptly ending.

The method of FIG. 3B comprises additional steps which are not present in the method of FIG. 3A. The steps with the same numerals as those of the method of FIG. 3A are equivalent and will not be explained again.

In the method illustrated by the flow chart of FIG. 3B, if the radio bearer is a non-real-time radio bearer, the method continues to a dropped if data in buffer and involuntary release step 26'.

In the dropped if data in buffer and involuntary release step 26', the release is determined to be a dropped connection when there is remaining user data in a buffer for transfer in either direction over the released radio bearer and also under the condition that the release is classified as an involuntary release. This can be more accurate in situations where the release is acceptable for the end user even if there is data in the buffer, e.g. during a handover from LTE to UMTS, etc.

After either of the dropped if involuntary release step 24 and the dropped if data in buffer step 26', the method continues to a conditional measurement period over step 28. The measurement period is a time period for which a drop rate measurement is to be calculated for. If the measurement period is not over yet, the method continues to the detect release step 20. Further detected releases can be for different (or the same) mobile terminals for which released radio bearers have previously been detected. On the other hand, if the measurement period is over, the method continues to an obtain session durations step 30.

In the obtain session durations step 30, session duration measurements are obtained for all radio bearers under the control of the radio network node in the measurement period. In other words, the session duration measurements relate to all sessions in the measurement period. All sessions during the measurement period can be defined as all sessions that started ended in the measurement period or that started and ended in the measurement period.

The session duration measurement can differ between real-time type bearers and non-real-time bearers. For real-time type radio bearers, the session duration can be determined to be the duration of when the radio bearer is established.

For non-real-time type radio bearers, the session duration can be determined to be the time between the start of the radio bearer until there is an absence of data transfer on the radio bearer during at least a predetermined inactivity time, as explained with reference to FIGS. 2A-B above. The predetermined inactivity time can be a parameter which is configurable.

In a calculate drop rate step 32, the drop rate is calculated by dividing the number of dropped connections during the measurement period with a sum of the session duration measurements during the measurement period. In this way, the drop rate reflects a probability of a dropped connection per unit of time. The drop rates can be aggregated for a part of or the entire, mobile communication network. Alternatively or additionally, the drop rate can be aggregated per service type, also known as application.

Figure 4A:
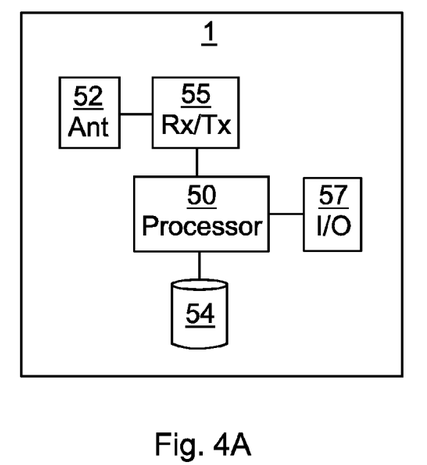
FIG. 4A is a schematic diagram showing some components of the network node of FIG. 1.

FIG. 4A is a schematic diagram showing some components of the network node of FIG. 1. A processor 50 is provided using any suitable central processing unit (CPU), multiprocessor, pool of processors, microcontroller, digital signal processor (DSP), application specific integrated circuit etc., capable of executing software instructions stored in a computer program product 54, e.g. in the form of a memory. The computer program product 54 can be a memory or any combination of read and write memory (RAM) and read only memory (ROM). The memory also comprises persistent storage, which, for example, can be any single one or combination of magnetic memory, optical memory, solid state memory or even remotely mounted memory.

The network node 1 further comprises an I/O interface 57 for communicating with the core network and optionally with other network nodes.

The network node 1 also comprises one or more transceivers 55, comprising analogue and digital components, and a suitable number of antennas 52 for radio communication with mobile terminals.

Other components of the network node are omitted in order not to obscure the concepts presented herein.

Figure 4B:
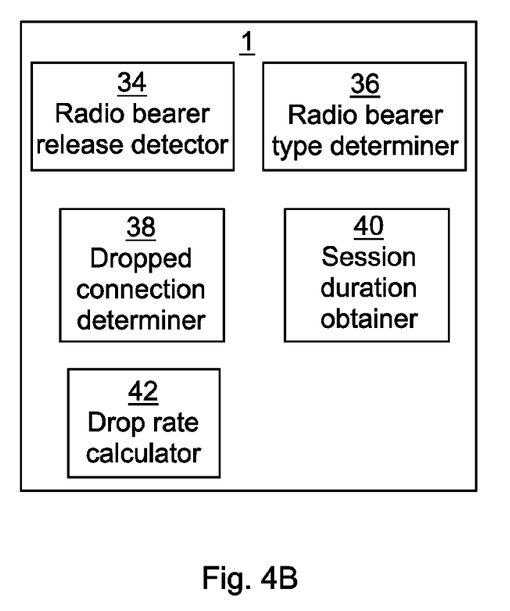
FIG. 4B is a schematic diagram showing functional modules of the network node of FIGS. 1 and 4A.

FIG. 4B is a schematic diagram showing functional modules of the network node of FIGS. 1 and 4A. The modules can be implemented using software such as a computer program executing in the service access apparatus 10. All modules depend on an execution environment which utilises a controller 40, a computer program product 42 and an I/O interface 44. The modules correspond to the methods as described with reference to FIGS. 3A-B.

A radio bearer release detector 34 is arranged to detect a release of the radio bearer associated with a mobile terminal.

A radio bearer type determiner 36 is arranged to determine whether the radio bearer is a real-time type radio bearer.

A dropped connection determiner 38 is arranged to determine when the released bearer is a dropped connection. When the radio bearer is a real-time type radio bearer, the released radio bearer is determined to be a dropped connection when the release is classified as an involuntary release. When the radio bearer is not a real-time type radio bearer, the released radio bearer is determined to be a dropped connection when there is remaining user data in a buffer for transfer in either direction over the released radio bearer. Optionally, the conditions above are the only conditions for determining a dropped connection.

Optionally, corresponding to what is described above, the radio bearer type determiner 36 is arranged to determine the radio bearer to be a real-time radio bearer when a quality of service class identifier, associated with the radio bearer, comprises a parameter indicating guaranteed bit rate. Optionally, the quality of service class identifier, associated with the radio bearer, may comprise an additional real-time parameter indicating a real-time service. The real-time parameter is then not part of any telecommunication standard with which the mobile communication network complies. The real-time parameter may override the parameter indicating guaranteed bit rate.

Optionally, the dropped connection determiner 38 is arranged to classify the release as an involuntary release using a release cause code associated with the released radio bearer. The involuntary release may be involuntary from a perspective of a user of the mobile terminal.

An optional session duration obtainer 40 is arranged to obtain session duration measurements for all radio bearers under the control of the radio network node during the measurement period.

The session duration obtainer 40 may be arranged to differ between real-time and non-real-time type radio bearers. For real-time type radio bearer, the session duration can be determined to be the duration of when the radio bearer is established. When the radio bearer differs from a real-time type radio bearer, the session duration may be determined to be the start of the radio bearer until there is no data transfer on the radio bearer during at least a predetermined inactivity time. The predetermined inactivity time can be configurable and may e.g. be 100 ms or any other suitable value.

An optional drop rate calculator 42 is arranged to calculate a drop rate measurement by dividing a number of dropped connections during the measurement period divided with a sum of the session duration measurements during the measurement period.

Figure 5:
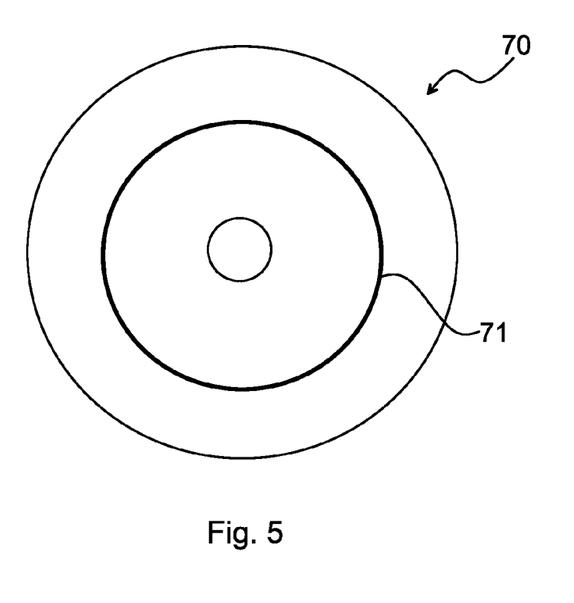
FIG. 5 shows one example of a computer program product comprising computer readable means.

FIG. 5 shows one example of a computer program product 70 comprising computer readable means. On this computer readable means, a computer program 71 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as the computer program product 54 of FIG. 4. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed in a network node of a mobile communication network, for determining a dropped connection to a mobile terminal, the method comprising:

detecting a release of a radio bearer associated with the mobile terminal;

determining whether the radio bearer is a real-time type radio bearer;

when the radio bearer is a real-time type radio bearer, determining the released radio bearer to be a dropped connection when the release is classified as an involuntary release; and when the radio bearer differs from a real-time type radio bearer, determining the released radio bearer to be a dropped connection when there is remaining user data in a buffer for transfer in either direction over the released radio bearer.

2. The method according to claim 1, wherein when the radio bearer is a real-time type radio bearer, the released radio bearer is determined to be a dropped connection only when the release is classified as an involuntary release; and when the radio bearer differs from a real-time type radio bearer, the released radio bearer is determined to be a dropped connection only when there is remaining user data in a buffer for transfer in either direction over the released radio bearer.

3. The method according to claim 1, wherein when the radio bearer differs from a real-time type radio bearer, the released radio bearer is determined to be a dropped connection when there is remaining user data in a buffer for transfer in either direction over the released radio bearer and the release is classified as an involuntary release.

4. The method according to claim 1, further comprising determining that the radio bearer is a real-time type radio bearer when a quality of service class identifier, associated with the radio bearer, comprises a parameter indicating guaranteed bit rate.

5. The method according to claim 1, wherein the radio bearer is determined to be a real-time type radio bearer when a quality of service class identifier, associated with the radio bearer, comprises a real-time parameter indicating a real-time service, which real-time parameter is absent from any telecommunication standard with which the mobile communication network complies.

6. The method according to claim 1, wherein the release is classified as an involuntary release using a release cause code associated with the released radio bearer.

7. The method according to claim 1, wherein the involuntary release is a release which is involuntary from a perspective of a user of the mobile terminal.

8. The method according to claim 1, further comprising:
determining a number of dropped connections during a measurement period for all mobile terminals under the control of the network node;
obtaining session duration measurements for all radio bearers under the control of the network node in the measurement period; and
calculating a drop rate measurement by dividing the number of dropped connections during the measurement period with a sum of the session duration measurements during the measurement period.

9. The method according to claim 8, wherein obtaining session duration measurements comprises, for a real-time type radio bearer, determining the session duration to be the duration of when the radio bearer is established; and for a radio bearer that differs from a real-time type radio bearer, determining the session duration to be the start of the radio bearer until there is an absence of data transfer on the radio bearer during at least a predetermined inactivity time.

10. The method according to claim 9, wherein the predetermined inactivity time is 100 milliseconds (ms).

11. A network node operative to be part of a mobile communication network also comprising a mobile terminal, the network node comprising:
a radio bearer release detector operative to detect a release of a radio bearer associated with the mobile terminal;
a radio bearer type determiner operative to determine whether the radio bearer is a real-time type radio bearer; and
a dropped connection determiner operative to:
when the radio bearer is a real-time type radio, determine the released radio bearer to be a dropped connection when the release is classified as an involuntary release; and
when the radio bearer differs from a real-time type radio bearer, determine the released radio bearer to be a dropped connection when there is remaining user data in a buffer for transfer in either direction over the released radio bearer.

12. The network node according to claim 11, wherein the dropped connection determiner is operative to:
when the radio bearer is a real-time type radio bearer, determine the released radio bearer to be a dropped connection only when the release is classified as an involuntary release; and
when the radio bearer differs from a real-time type radio bearer, determine the released radio bearer to be a dropped connection only when there is remaining user data in a buffer for transfer in either direction over the released radio bearer.

13. The network node according to claim 11, wherein the dropped connection determiner is operative to:
when the radio bearer differs from a real-time type radio bearer, determine the released radio bearer to be a dropped connection when there is remaining user data in a buffer for transfer in either direction over the released radio bearer and the release is classified as an involuntary release.

14. The network node according to claim 11, wherein the radio bearer type determiner is operative to determine the radio bearer to be a real-time radio bearer when a quality of service class identifier, associated with the radio bearer, comprises a parameter indicating guaranteed bit rate.

15. The network node according to claim 11, wherein the radio bearer type determiner is operative to determine the radio bearer to be a real-time radio bearer when a quality of service class identifier, associated with the radio bearer, comprises a real-time parameter indicating a real-time service, which real-time parameter is absent from any telecommunication standard with which the mobile communication network complies.

16. The network node according to claim 11, wherein the dropped connection determiner is operative to classify the release as an involuntary release by use of a release cause code associated with the released radio bearer.

17. The network node according to claim 11, wherein the involuntary release is a release which is involuntary from a perspective of a user of the mobile terminal.

18. The network node according to claim 11, further comprising:
a session duration obtainer operative to obtain session duration measurements for all radio bearers under the control of the network node during a measurement period; and
a drop rate calculator operative to calculate a drop rate measurement by division of a number of dropped connections during the measurement period divided with a sum of the session duration measurements during the measurement period.

19. The network node according to claim 18, wherein the session duration obtainer is operative to:
   when the radio bearer is a real-time type radio bearer, determine the session duration to be the duration of when the radio bearer is established; and
   when the radio bearer differs from a real-time type radio bearer, determine the session duration to be the start of the radio bearer until there is an absence of data transfer on the radio bearer during at least a predetermined inactivity time.

20. The network node according to claim 19, wherein the predetermined inactivity time is 100 milliseconds (ms).

21. A non-transitory computer-readable storage medium storing a computer program comprising computer program code which, when run on a network node, causes the network node to:
   detect a release of a radio bearer associated with a mobile terminal;
   determine whether the radio bearer is a real-time type radio bearer;
   when the radio bearer is a real-time type radio bearer, determine the released radio bearer to be a dropped connection when the release is classified as an involuntary release; and
   when the radio bearer differs from a real-time type radio bearer, determine the released radio bearer to be a dropped connection when there is remaining user data in a buffer for transfer in either direction over the released radio bearer.

* * * * *